(12) United States Patent
Shikata et al.

(10) Patent No.: US 7,901,495 B2
(45) Date of Patent: Mar. 8, 2011

(54) INKJET INK

(75) Inventors: Yoshiaki Shikata, Tomi (JP); Nami Hatakeyama, Tomi (JP); Isao Tabayashi, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 292 days.

(21) Appl. No.: 12/240,551

(22) Filed: Sep. 29, 2008

(65) Prior Publication Data

US 2009/0139432 A1 Jun. 4, 2009

(30) Foreign Application Priority Data

Dec. 3, 2007 (JP) ................................. 2007-311943

(51) Int. Cl.
*C09D 11/02* (2006.01)
*C08L 31/04* (2006.01)
(52) U.S. Cl. ................ 106/31.43; 106/31.58; 106/31.75; 106/31.86; 524/563
(58) Field of Classification Search ............... 106/31.43, 106/31.58, 31.75, 31.86; 524/563
See application file for complete search history.

(56) References Cited

U.S. PATENT DOCUMENTS

| | | | | | |
|---|---|---|---|---|---|
| 4,610,554 | A | * | 9/1986 | Suzuki et al. | 106/31.43 |
| 4,975,117 | A | * | 12/1990 | Tabayashi et al. | 106/31.58 |
| 5,069,719 | A | * | 12/1991 | Ono | 106/31.43 |
| 5,076,843 | A | * | 12/1991 | Acitelli et al. | 106/31.58 |
| 5,160,535 | A | * | 11/1992 | Cooke et al. | 106/31.58 |
| 7,125,447 | B2 | * | 10/2006 | Sugita et al. | 106/31.58 |
| 7,625,440 | B2 | * | 12/2009 | Wynants et al. | 106/31.86 |
| 2004/0171738 | A1 | * | 9/2004 | Harz et al. | 524/556 |
| 2004/0266907 | A1 | | 12/2004 | Sugita et al. | |
| 2006/0217458 | A1 | * | 9/2006 | Shakhnovich | 523/160 |
| 2008/0250967 | A1 | * | 10/2008 | Souma et al. | 106/31.13 |
| 2009/0139431 | A1 | * | 6/2009 | Shikata et al. | 524/563 |
| 2009/0143509 | A1 | * | 6/2009 | Shikata et al. | 524/563 |

FOREIGN PATENT DOCUMENTS

JP 2006-225603 8/2006
WO WO 2004/007626 1/2004

* cited by examiner

*Primary Examiner* — Helene Klemanski
(74) *Attorney, Agent, or Firm* — Ditthavong Mori & Steiner, P.C.

(57) ABSTRACT

An inkjet ink containing a colorant, where an amine compound is added as a pH adjuster. The ink is capable of preventing the pH of the ink from being shifted to the acidity side due to corrosive substances (e.g., acid substances) generated by deterioration of ink, adverse effects due to water absorption and moisture absorption, or degradation of resin (e.g., degradation of vinyl chloride-vinyl acetate copolymer resin), thus preventing erosion of a head nozzle member.

3 Claims, No Drawings

INKJET INK

CROSS-REFERENCE TO RELATED APPLICATION

The present application claims priority to Japanese Patent Application No. 2007-311943, filed on Dec. 3, 2007, the entire contents of which are herein incorporated by reference.

BACKGROUND OF THE INVENTION

1. Field of the Invention

The present invention relates to ink for inkjet printing.

2. Discussion of the Background

Various different inkjet recording methods have been proposed, for example, a method of utilizing electrostatic attraction to eject ink droplets (so-called electric-field control method), a method of utilizing vibration pressure of a piezoelectric element to eject ink droplets (so-called drop-on-demand method (pressure pulse method)), and a method of utilizing pressure that is generated by forming and developing air bubbles with high temperature (so-called thermal inkjet method). These methods allow extremely high-definition images to be obtained.

These inkjet recording methods typically use water-based inks using water as the main solvent and oil-based inks using organic solvent as the main solvent. Generally, images printed using a water-based ink have poor water resistance, while oil-based ink can provide images having excellent water resistance.

Thus, various inkjet inks have been developed and used.

If the pH of an inkjet ink is shifted to the acidity side, head nozzles may be eroded (corroded), thus causing non-ejection and deflection of ink. For example, in a solvent/oil-based ink, corrosive substances (e.g., acid substances) are generated due to deterioration of the ink, adverse effects are caused by water absorption and moisture absorption, and degradation of resin (e.g., degradation of vinyl chloride-vinyl acetate copolymer resin) can occur. If the pH of the inkjet ink is shifted to the acidity side due to such corrosive substances, a head nozzle member is eroded, thus causing non-ejection and deflection of ink.

Conventionally, there is a precedent that an anti-rust material such as benzotriazole is added into the ink so that it adsorbs onto the surface of the head nozzle member so as to form a protective layer for preventing the erosion of the head nozzle member. However, this does not prevent the pH of ink from being shifted to the acidity side (see, e.g., JP-A-2006-225603).

Thus, it is desired to provide an inkjet ink that is effective in preventing the nozzle member from being eroded.

SUMMARY OF THE INVENTION

The present invention advantageously provides a non-water-based inkjet ink containing a colorant, wherein an amine compound is added as a pH adjuster.

In an embodiment, the pH adjuster is an alcohol amine compound.

In a further embodiment, the alcohol amine compound is one or a mixture of two or more selected from a group consisting of N-ethyl ethanolamine, N, N-Di-n-butylethanolamine, N, N-dimethylethanolamine, N-methyldiethanolamine, and N-tert-butyldiethanolamine.

In another embodiment, the inkjet ink contains vinyl chloride-vinyl acetate copolymer resin as a resin.

In a still further embodiment, the inkjet ink contains a solvent of one or a mixture of two of solvents represented by the following general formulas as a solvent for dissolving the vinyl chloride-vinyl acetate copolymer resin

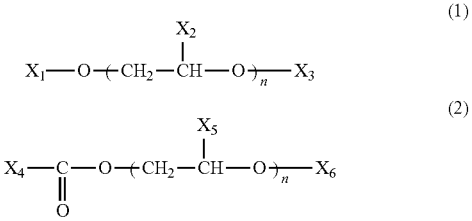

wherein, in the above formulas (1) and (2), each of $X_1$ through $X_6$ is H or an alkyl group, and n is an integer from 1 to 4.

DETAILED DESCRIPTION OF EXEMPLARY EMBODIMENTS OF THE INVENTION

A non-water-based inkjet ink is described herein that is capable of preventing the pH of the ink from being shifted to the acidity side due to corrosive substances (e.g., acid substances) generated by deterioration of ink, adverse effects due to water absorption and moisture absorption, or degradation of resin (for example, degradation of vinyl chloride-vinyl acetate copolymer resin), thus preventing erosion of a head nozzle member.

According to an embodiment of the present invention, there is provided a non-water-based inkjet ink capable of preventing the pH of the ink from being shifted to the acidity side due to corrosive substances (e.g., acid substances) generated by deterioration of ink, adverse effects due to water absorption and moisture absorption, or degradation of resin (e.g., degradation of vinyl chloride-vinyl acetate copolymer resin), thus preventing erosion of a head nozzle member.

Since the non-water-based inkjet ink of the embodiment is excellent in preventing the erosion of the nozzle member, the head can be prevented from being damaged so that the ink can be stably ejected even for a long period of continuous use.

In a first arrangement, a non-water-based inkjet ink is characterized in that an amine compound as a pH adjuster is added.

Adding the amine compound (amines) as a pH adjuster into the non-water-based inkjet ink causes neutralization reaction so as to prevent the pH of the ink from being shifted to the acidity side, thereby exhibiting effective prevention of erosion of the head nozzle member which is cased due to shifting of the pH of the ink to the acidity side.

In the non-water-based inkjet ink of the embodiment, the amine compound (amines) is preferably added in such an amount that the effect of preventing erosion of the head nozzle member can be substantially found. More preferably, the amine compound is added in such an amount that the effect of preventing erosion of the head nozzle member can be sufficiently found more than for practical use.

In a second arrangement, it is preferable that an alcohol amine compound is added as a pH adjuster.

The alcohol amine compound (amino alcohol) is excellent in effect of preventing erosion of the head nozzle member.

In a third arrangement, it is preferable that the alcohol amine compound is one or a mixture of two or more selected from a group consisting of N-ethyl ethanolamine, N, N-Din-butylethanolamine, N, N-dimethylethanolamine, N-methyldiethanolamine, and N-tert-butyldiethanolamine.

These alcohol amine compounds (amino alcohol) are excellent in both two aforementioned anti-rust effects.

In the non-water-based inkjet ink, adding the amine compound (particularly, alcohol amines) into the inkjet ink provides an effect of neutralizing acid substances (carboxylic acid, hydrochloric acid) produced by hydrolysis and oxidization of resin. In this case, it is preferable that the amine compound is added in such a manner as to exhibit substantially effectively the functional effect.

Examples of the aforementioned amine compound include aliphatic amines and aromatic amines such as trimethylamine, triethylamine, isopropylamine, tri-n-butylamine, n-hexylamine, dodecylamine, dioctylamine, and tri-n-octylamine, monoethanolamine, diethanolamine, triethanolamine, monopropanolamine, dipropanolamine, tripropanolamine, monoisopropanolamine, diisopropanolamine, triisopropanolamine, aminomethylpropanolamine, and alcohol amines such as N,N-dimethylethanolamine, N,N-diethylethanolamine, N,N-dibutylethanolamine, N,N-Di-n-butylethanolamine, N-(β-aminoethyl)ethanolamine, N-methylethanolamine, N-methyldiethanolamine, N-ethylethanolamine, N-n-butylethanolamine, N-n-butyldiethylethanolamine, N-n-butyldiethanolamine, N-tert-butylethanolamine, , and N-tert-buthildiethanolamine.

It is preferable to use alcohol amines as the amines because using alcohol amines can excellently exhibit the functional effect of preventing the head nozzle member from being eroded.

Preferable examples of the alcohol amines are alcohol amines such as N,N-dimethylethanolamine, N,N-diethylethanolamine, N,N-dibutylethanolamine, N,N-Di-n-butylethanolamine, N-(β-aminoethyl)ethanolamine, N-methylethanolamine, N-methyldiethanolamine, N-ethylethanolamine, N-n-butylethanolamine, N-n-butyldiethylethanolamine, N-tert-butylethanolamine, and N-tert-butyldiethanolamine because using such alcohol amines can excellently exhibit the functional effect of preventing the head nozzle member from being eroded.

In a fourth arrangement the non-water-based inkjet ink preferably contains vinyl chloride-vinyl acetate copolymer resin as a resin.

This is because, as for solvent/oil-based inks, corrosive substances (e.g., acid substances) are generated due to deterioration of ink, adverse effects due to water absorption and moisture absorption, and, for example, degradation of vinyl chloride-vinyl acetate copolymer resin as the binder resin, thus shifting the pH of the ink to the acidity side and therefore eroding a head nozzle member so as to cause non-ejection and deflection of ink. The effect in case of using the vinyl chloride-vinyl acetate copolymer resin may be greater than that in case of using other resins.

The ink described herein is suitably adapted to an inkjet ink as a solvent/oil-based ink containing a solvent and vinyl chloride-vinyl acetate copolymer resin.

The ink described herein is suitably adapted to an inkjet ink as a solvent/oil-based ink containing vinyl chloride-vinyl acetate copolymer resin as the binder resin, for example.

In the present invention, examples of the vinyl chloride-vinyl acetate copolymer resin include VYNS-3, VYHH, VYHD, VMCH, VMCC, VMCA, VERR-40, VAGH, VAGD, VAGF, and VROH manufactured by The Dow Chemical Company, SOLBIN C, SOLBIN CL, SOLBIN CH, SOLBIN CN, SOLBIN C5, SOLBIN C5R, SOLBIN M, SOLBIN ML, SOLBIN TA5R, SOLBIN TAO, SOLBIN MK6, SOLBIN TA2 and so on manufactured by Nisshin Chemical Industry, Co., Ltd.

In a fifth arrangement, it is preferable to use a solvent of one or a mixture of two of solvents represented by the following general formulas as the solvent for dissolving the aforementioned vinyl chloride-vinyl acetate copolymer resin.

This is because these have good properties with less erosion of the head member and erosion of media as compared to the case using another solvent.

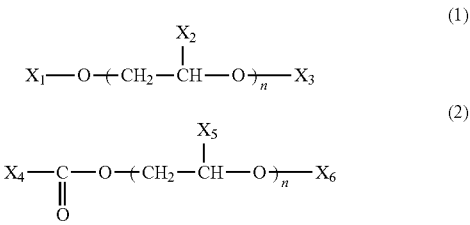

In the above formulas (1), (2), each of $X_1$ through $X_6$ is H or an alkyl group, and n is an integer from 1 to 4.

In the embodiment, solvents represented by the above formula (1) include polyoxyethylene alkyl ethers such as diethylene glycol monohexyl ether (e.g., trade name: Hexyldiglycol (HeDG) available from Nippon Nyukazai Co., Ltd.), diethylene glycol hexylether, dipropylene glycol dimethyl ether (e.g., trade name: dimethyl propylene glycol (DMFDG) available from Nippon Nyukazai Co., Ltd.), diethylene glycol diethyl ether (e.g., trade name: diethyl digrycol (DEDG) available from Nippon Nyukazai Co., Ltd.).

In the embodiment, solvents represented by the above formula (2) include polyoxyethylene alkyl ether acetates such as propylene glycol monomethyl ether acetate (abbr. PMA), dipropylene glycol (mono)methyl ether acetate (dipropylene glycol monomethyl ether monomethyl acetate) (abbr. DPMA), and ethylene glycol monobutyl ether acetate (abbr. BMGAC).

The oil-based inkjet ink preferably contains a colorant and a binder resin which are suitably dissolved or dispersed in the solvent together with the dispersant (e.g., see International Publication No. WO2004-007626). The contents of WO2004-007626 are incorporated herein by reference in their entirety.

As a method of producing the oil-based inkjet ink, a solvent or a mixed solvent is prepared as the solvent of ink composition. A pigment and a dispersant are added into a part of the solvent and are mixed and dispersed by a ball mill, a bead mill, an ultrasonic mill, or a jet mill so as to obtain a pigment dispersed liquid. The residual of the aforementioned solvent, a binder resin, and other additives are added into the obtained pigment dispersed liquid while being stirred, thereby producing the ink composition.

In the aforementioned ink composition, the binder resin is preferably vinyl chloride-vinyl acetate copolymer resin. Another binder resin of rosin series, acrylic series, polyester series, or urethane series may be used together with the vinyl chloride-vinyl acetate copolymer resin.

A stabilizer such as an oxidation inhibitor and an ultraviolet absorber, a surface acting agent may be added into the aforementioned ink composition. As the oxidation inhibitor, BHA (2,3-butyl-4-oxyanisol), BHT (2,6-di-t-butyl-p-cresol) may be employed and its amount is of from 0.01% to 3.0% by weight relative to the oil-based ink composition. As the ultraviolet absorber, a benzophenone compound or a benzotriazole compound may be employed and its amount is of from 0.01% to 0.5% by weight relative to the oil-based ink composition.

In addition, as the surface acting agent, any of anionic, cationic, and amphoteric or nonionic surface acting agents may be employed and its amount is of from 0.5% to 4.0% by weight relative to the oil-based ink composition.

EXAMPLES

Hereinafter, the present invention will be specifically described with reference to examples. However, the present invention is not limited these examples.
Preparation of Resin Solutions I
The following mixed solvent was used as the solvent:
(i) Propylene glycol monomethyl ether acetate (abbr. PMA): 20 parts by weight;
(ii) Diethylene glycol monohexyl ether (trade name: Hexyldiglycol (HeDG) available from Nippon Nyukazai Co., Ltd.): 20 parts by weight; and
(iii) Ethylene glycol monobutyl ether acetate: 60 parts by weight.

Vinyl chloride-vinyl acetate copolymer resin (VCVAC resin) was added into the aforementioned mixed solvent while being stirred. The resin was dissolved by a stirrer (three-one motor available from Shinto Scientific Co., Ltd.) while being warmed at about 50° C. for 1 hour by a water bath so as to obtain Resin Solutions I with a resin concentration of 5 wt %. As the vinyl chloride-vinyl acetate copolymer resin, SOLBIN C5R available from Nisshin Chemical Industry, Co., Ltd. or VYHD available from Dow Chemical Company was used.
Preparation of Resin Solution II
The following additives:
(1) as a stabilizer for vinyl chloride, 0-130P available from ADEKA Corporation or #8102 available from Nitto Kasei Co., Ltd. (both are organotin compound and epoxidized vegitable oils);
(2) as an amino alcohol solution, one of the follows:
(i) N, N-Di-n-butylethanolamine (trade name: Amino Alcohol 2B available from Nippon Nyukazai Co., Ltd.) (represented by A-2B in Table 1),
(ii) N, N-dimethylethanolamine (trade name: Amino Alcohol 2Mabs available from Nippon Nyukazai Co., Ltd.) (represented by A-2Mabs in Table 1),
(iii) N-methyldiethanolamine (trade name: Amino Alcohol MDA available from Nippon Nyukazai Co., Ltd.) (represented by A-MDA in Table 1), and
(iv) N-tert-butyldiethanolamine (trade name: Amino Alcohol BDEA available from Nippon Nyukazai Co., Ltd.) (represented by t-BDEA in Table 1); and
(3) water
were added into the Resin Solutions I and stirred so as to obtain Resin Solutions II. Similarly, resin solutions in which parts or all of the aforementioned (1) through (3) were not added as shown in Table 1 were used as comparative examples.

The additive amount of the stabilizer was 0.1 wt %, the additive amount of the amino alcohol solvent was 0.5 wt %, and the additive amount of water was 2 wt % relative to the amount of the resin solution.

EVALUATION

After the pH of each Resin Solutions II was measured by using pH-test paper, the Resin Solution II was entered in a 60° C. constant-temperature bath and was left for 1 month. The pH was measured by using a pH-test paper at the $0^{th}$ day (i.e., immediately after the preparation), the $14^{th}$ day, and the $30^{th}$ day from the start of leaving. The results are shown in Table 1.

As shown in Table 1, in case of the VCVAC Resin Solution I and a resin solution in which only the stabilizer was added into the VCVAC Resin Solution I (comparative examples), the pH was shifted to the acidity side. However, in case of resin solutions in which the amino alcohol solution was added (examples), the pH could be kept to be neutral or faintly alkaline even if water was mixed.

Using the resin solutions of the examples and comparative examples (or inkjet inks which were prepared by adding colorant and the like), degrees of damage of inkjet heads were checked.

As a result, in case of using any of the resin solutions of the comparative examples, it was found that the head nozzle member was eroded, thus causing non-ejection and deflection of ink. However, in case of using any of the resin solutions of the examples, no erosion of the head nozzle member was observed.

| Resin Solution | Additives | | | Leaving Period (day) | | |
|---|---|---|---|---|---|---|
| | Amino Alcohol | Stabilizer | Others | $0^{th}$ day | $14^{th}$ day | $30^{th}$ day |
| C5R 5% | None | None | None | 5 | 5 | 4 |
| | None | #8102 | None | 5 | 4-5 | 4 |
| | None | O-130P | None | 5 | 4-5 | 4 |
| | None | None | Water | 5 | 4-5 | 4 |
| | None | #8102 | Water | 5 | 4 | 3 |
| | None | O-130P | Water | 5 | 4-5 | 3-4 |
| | A-2B | None | None | 8-9 | 9 | 9 |
| | A-2B | None | Water | 8-9 | 9-10 | 9 |
| | A-2B | #8102 | Water | 8-9 | 9 | 8 |
| | A-2B | O-130P | Water | 8-9 | 9 | 9 |
| | A-2Mabs | None | None | 10 | — | 11 |
| | A-2Mabs | None | Water | 10 | — | 11 |
| | A-2Mabs | #8102 | Water | 9-10 | — | 10 |
| | A-2Mabs | O-130P | Water | 10 | — | 11 |
| | A-MDA | None | None | 9-10 | 9 | 10 |
| | A-MDA | None | Water | 9 | 9-10 | 10 |
| | A-MDA | #8102 | Water | 9 | 8 | 9 |
| | A-MDA | O-130P | Water | 9-10 | 9 | 10 |
| | t-BDEA | None | None | 9 | — | 10 |
| | t-BDEA | None | Water | 9 | — | 10 |
| | t-BDEA | #8102 | Water | 9 | — | 9 |
| | t-BDEA | O-130P | Water | 8-9 | — | 10 |
| VYHD 5% | None | None | None | 5 | 4-5 | 4 |
| | None | #8102 | None | 5 | 4-5 | 3-4 |
| | None | O-130P | None | 5 | 4-5 | 3-4 |
| | None | None | Water | 5 | 4 | 3 |
| | None | #8102 | Water | 5 | 4 | 3 |
| | None | O-130P | Water | 5 | 4 | 3-4 |
| | A-2B | None | None | 8-9 | 8 | 9 |
| | A-2B | None | Water | 8-9 | 8-9 | 9 |
| | A-2B | #8102 | Water | 8-9 | 8 | 8 |
| | A-2B | O-130P | Water | 9 | 9 | 9 |
| | A-2Mabs | None | None | 10 | — | 11 |
| | A-2Mabs | None | Water | 10 | — | 11 |
| | A-2Mabs | #8102 | Water | 10 | — | 10 |
| | A-2Mabs | O-130P | Water | 10 | — | 11 |
| | A-MDA | None | None | 9-10 | 9 | 10 |
| | A-MDA | None | Water | 9 | 9-10 | 10 |
| | A-MDA | #8102 | Water | 9 | 9-10 | 10 |
| | A-MDA | O-130P | Water | 9-10 | 9 | 9 |
| | t-BDEA | None | None | 9 | — | 10 |
| | t-BDEA | None | Water | 9 | — | 9-10 |
| | t-BDEA | #8102 | Water | 9 | — | 9 |
| | t-BDEA | O-130P | Water | 9 | — | 10 |

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A non-water-based inkjet ink containing a colorant, wherein an amine compound is added as a pH adjuster,
   wherein said inkjet ink contains vinyl chloride-vinyl acetate copolymer resin as a resin,
   wherein said inkjet ink contains a solvent of one or a mixture of two of solvents represented by the following general formulas as a solvent for dissolving said vinyl chloride-vinyl acetate copolymer resin:

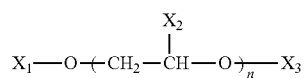
(1)

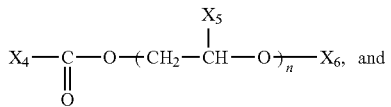
(2)

wherein, in the above formulas (1) and (2), each of $X_1$ through $X_6$ is H or an alkyl group, and n is an integer from 1 to 4.

2. The non-water-based inkjet ink as claimed in claim 1, wherein said pH adjuster is an alcohol amine compound.

3. The non-water-based inkjet ink as claimed in claim 2, wherein said alcohol amine compound is one or a mixture of two or more selected from a group consisting of N-ethyl ethanolamine, N, N-Di-n-butylethanolamine, N, N-dimethylethanolamine, N-methyldiethanolamine, and N-tert-butyldiethanolamine.

* * * * *